United States Patent [19]

Gerger et al.

[11] Patent Number: 4,540,979
[45] Date of Patent: Sep. 10, 1985

[54] GRIP-RESPONSIVE OPERATOR ALERTNESS MONITOR

[76] Inventors: Edward J. Gerger, 1202 Forest Dr., Portage, Mich. 49081; Scott A. Gerger, 36 Midland Ave., Rochester, N.Y. 14621

[21] Appl. No.: 426,076

[22] Filed: Sep. 28, 1982

[51] Int. Cl.$^3$ .............................................. G08B 21/00
[52] U.S. Cl. .................................. 340/576; 180/272; 340/575
[58] Field of Search ................. 340/576, 575; 180/272

[56] References Cited
U.S. PATENT DOCUMENTS 2,575,926 11/1951 Murray ................................ 340/576
3,585,626 6/1971 Tartarini ............................. 340/575
4,278,969 7/1981 Woods .................................. 180/272

Primary Examiner—Glen R. Swann, III
Attorney, Agent, or Firm—Lawrence P. Kessler

[57] ABSTRACT

A grip-responsive operator alertness monitor for maintaining operator alertness includes a pressure sensor associated with a mechanism for controlling a vehicle. The pressure sensor detects operator fatigue as exhibited by a change in operator pressure on the control mechanism. An operator stimulus is coupled to the pressure sensor and, upon sensing fatigue, produces a stimulus such as a visual or audible alarm whereby alertness of the operator is maintained.

5 Claims, 4 Drawing Figures

GRIP-RESPONSIVE OPERATOR ALERTNESS MONITOR

BACKGROUND OF THE INVENTION

This invention relates generally to a vehicle safety apparatus, and more particularly to an alertness monitor for sensing vehicle operator fatigue and providing an appropriate warning signal to such operator.

The motor vehicle, while being one of man's greatest modern technilogical advances, also represents one of man's significant instruments of death, injury, and property damage. However, most motor vehicle accidents can be traced directly to operator error rather than through any fault of the vehicle itself. A primary cause of such operator related vehicle accidents is operator fatigue. Fatigue decreases the alertness of the operator such that proper attention is not paid to operation of the vehicle. Fatigue can result from vehicle operation over extended periods of time or under monotonous operating conditions. Moreover, the opertor's physiological condition with regard to the influence of alcohol, drugs or mere mental preoccupation has a direct bearing on fatigue. When an operator is fatigued, his control over the vehicle is impaired and may become erratic to the point where an accident is possible.

Many proposals have been made for preventing hazardous vehicle operation due to lack of operator alertness resulting, for example, from fatigue. For example, dexterity tests may be coupled to the ignition system for the vehicle so that if such tests are not successfully completed by the operator, the vehicle cannot be started. However, such dexterity tests are not applicable to conditions existent after the vehicle is in operation. Other proposals include requiring the operator to respond to external stimuli in order to check his degree of alertness or examining the operator's physical condition by, for example, measuring operator eyeball movement or steering wheel oscillations. However, such proposals are comparatively slow in detecting a decrease in alertness and, further, are often erroneous due to the various conditions over which the vehicle is operated. Moreover, physical motion sensing mechanisms are cumbersome and interfere with normal operator control of the vehicle.

SUMMARY OF THE INVENTION

This invention is directed to a grip-responsive operator alertness monitor for maintaining operator alertness. The alertness monitor includes a pressure sensor associated with a mechanism for controling a vehicle. The pressure sensor detects operator fatigue as exhibited by a change in operator pressure on the control mechanism. An operator stimulus is coupled to the pressure sensor and, upon sensing fatigue, produces a stimulus such as a visual or audible alarm whereby alertness of the operator is maintained.

The invention, and its objects and advantages, will become more apparent in the detailed description of the preferred embodiment presented below.

BRIEF DESCRIPTION OF THE DRAWINGS

In the detailed description of the preferred embodiment of the invention reference is made to the accompanying drawings, in which.

DESCRIPTION OF THE PREFERRED EMBODIMENT

Figure 1:
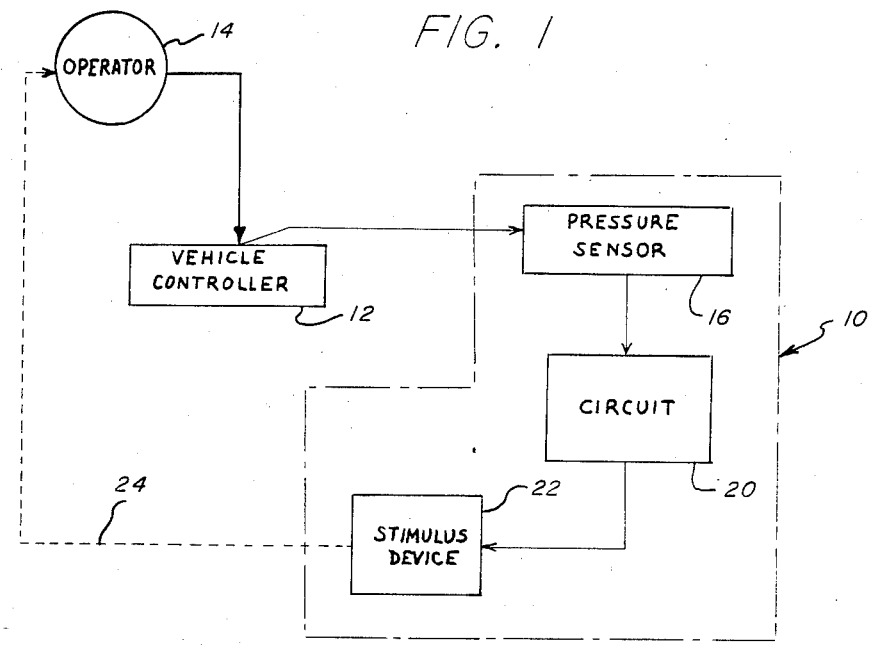
FIG. 1 is a functional block diagram of the alertness monitor according to this invention.

Referring now to the accompanying drawings, in the functional block diagram of FIG. 1, the alertness monitor designated by the numeral 10 (within the broken-line block) is operatively associated with a controller apparatus designated by the numeral 12 for a vehicle such as a car or truck for example. Such vehicle controller apparatus 12 may be, for example, a steering wheel. However, other manually engageable controllers for other types of vehicles, such as a joy stick for an airplane for example, would be suitable for use with this invention. The controller apparatus 12 is manually grasped by an operator, designated by the numeral 14, to control operation of the vehicle.

In grasping the vehicle controller apparatus 12, the operator 14 produces a degree of pressure on the controller apparatus. It has been found that as operator fatigue occurs, or general operator alertness decreases, the pressure on the controller apparatus 12 correspondingly decreases. As such, the vehicle safety apparatus 10 includes a pressure sensor 16 which detects operator pressure on the vehicle controller apparatus 12. When a decrease in operator pressure on the vehicle controller is detected by the pressure sensor 16, such sensor sends a signal to a circuit designated by the numeral 20 (described in greater detail with reference to FIG. 4), and in response to such signal the circuit activates an operator stimulus device, designated by the numeral 22. The stimulus device 22 may be a visual or audible alarm signal, designated by the dashed line 24. Such signal stimulates the operator to maintain his alertness.

Figure 3:
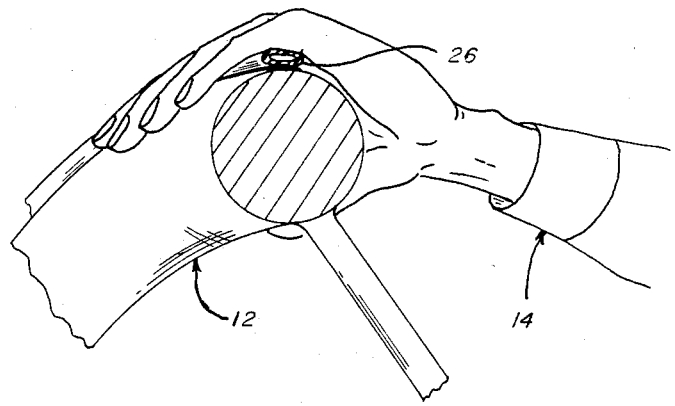
FIG. 3 is a cross-sectional view of the vehicle controller and pressure sensor of FIG. 2.
Figure 2:
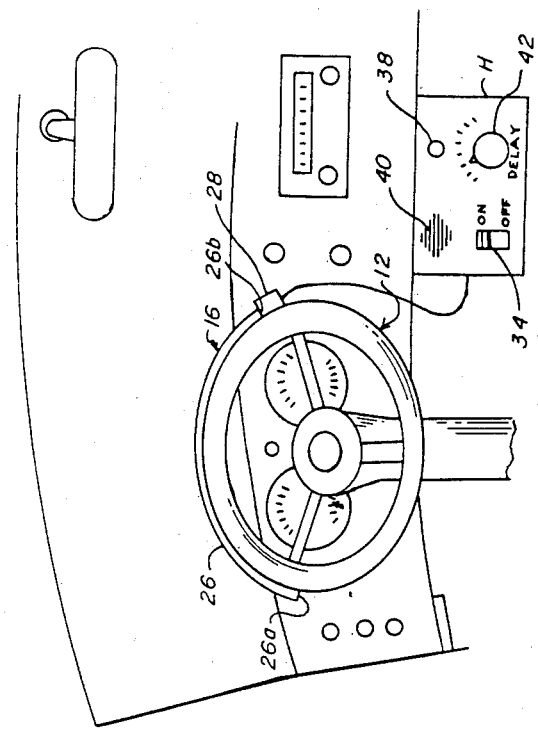
FIG. 2 is a view in perspective of a portion of the interior of a vehicle showing the alertness monitor according to this invention.

In the illustrative embodiment of FIGS. 2 and 3, the vehicle controller apparatus 12 is an automobile or truck steering wheel. The alertness monitor 10 includes a housing H mounted on the vehicle dash; alternatively, the housing may be directly mounted on the steering wheel or on its support post. The pressure sensor 16 of the alertness monitor 10 is a flexible, dimensionally stable, tube 26 of silicone rubber for example. The tube 26 is associated with that portion of the circumference of the steering wheel manually grasped by the operator. For example, the tube may be fixed to the wheel by suitable clamps or permanent affixing means such as epoxy cement. One end 26a of the tube 26 is sealed and the opposite end 26b is connected to a pressure sensitive switch 28. A suitable pressure sensitive switch is the Fairchild Model PSF 100A Ultra Low Differential Pressure Sensor available for Dumont Instrumentation, Inc. of Commack, N.Y. When the operator 14 grasps the wheel, the tube 26 is compressed and the air trapped within the tube exerts pressure on the switch 28 sufficient to close the switch. The switch may be located on the steering wheel with suitable electrical leads coupled to the circuit 20 mounted in the housing H of alertness monitor 10; or alternatively, the tube 26 may extend from the wheel to a pressure switch in the housing H.

Figure 4:
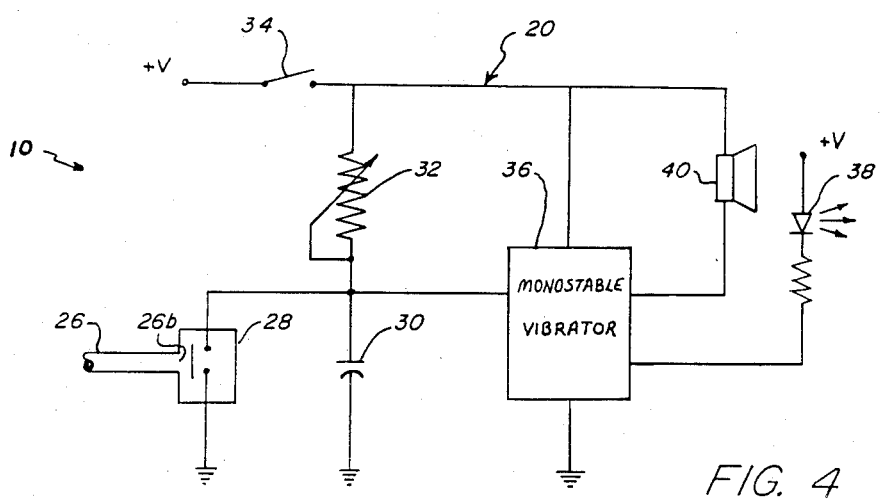
FIG. 4 is a circuit diagram for the alertness monitor according to this invention.

As schematically shown in FIG. 4, the circuit 20 of the vehicle safety apparatus 10 includes a capacitor 30 in parallel with the switch 28. The capacitor 30 and switch 28 are connected to a power supply +V, such as the electrical power supply of the vehicle, through a variable resistor 32 and an on/off switch 34. Of course an internal power supply such as a dry cell battery would be suitable for use with this invention. The monitor 10 is activated by closing the switch 34 (moving switch to "on" position in FIG. 2), and when the pressure switch 28 is closed by operator pressure on the tube 26, the circuit 20 is shorted to ground through switch 28.

However, when the operator becomes fatigued and his grip on the steering wheel changes (relaxes), the air pressure on the switch 28 is reduced and the switch is opened allowing the voltage of the power supply to charge up the capacitor 30. At the time the capacitor 30 is fully charged, voltage of the power supply +V is applied to a monostable vibrator 36 to activate the operator stimulus device 22. Such device 22 is, for example, a lamp 38, such as a light emitting diode, and an audible alarm 40. When the device 22 is activated, the operator is warned of his fatigued condition and can govern his driving actions accordingly. For example, if fatigue is mild, merely regripping of the steering wheel will short the circuit 20 and deactivate the stimulus device 22. However, if the stimulus device is repeatably activated, the operator may have to cease vehicle operation. The variable resistor 32 adjustably sets the time period for charging of the capacitor 30. Such adjustment is set by manually turning an adjusting knob 42 on the housing H (see FIG. 2) coupled to the variable resistor 32 to provide a variable time delay to allow for periodic, non-fatigue generated, release in operator pressure on the steering wheel (and tube 26). This enables the operator to change his grip, for example, without actuating the stimulus device 22.

The invention has been described in detail with particular reference to a preferred embodiment thereof, but it will be understood that variations and modifications can be effected within the spirit and scope of the invention.

We claim:

1. In a vehicle having means manually gripped by an operator for controlling operation thereof, an improved monitor for maintaining operator alertness, said monitor comprising:

means, operatively associated with said control means, for sensing operator grip pressure on such control means, said pressure sensing means including a flexible tube closed at one end;

a pressure sensitive switch, operatively coupled to the other end of said tube of said sensing means trapping air within said tube, said switch being changed from a closed state to an open state for producing a signal when operator pressure decreases; and means, operatively coupled to said pressure sensitive switch for producing an operator stimulus in response to a signal from said switch, whereby operator alertness is maintained.

2. The invention of claim 1 wherein said operator stimulus producing means includes a power source, means selectively coupled to said power source for producing an alarm signal, and means coupled to said pressure sensitive switch for effecting coupling of said power source to said alarm signal producing means when said switch is in such open state.

3. The invention of claim 2 wherein said alarm signal producing means includes means for producing a visual alarm signal.

4. The invention of claim 2 wherein said alarm signal producing means includes means for producing an audible alarm signal.

5. The invention of claim 2 wherein said alarm signal producing means includes adjustable time delay means for adjustably delaying production of such operator stimulus for a preselected period of time.

* * * * *